Oct. 20, 1942.　　　G. E. HOLMAN　　　2,299,720
LUMINESCENT COATING FOR ELECTRIC LAMPS
Filed Oct. 26, 1940
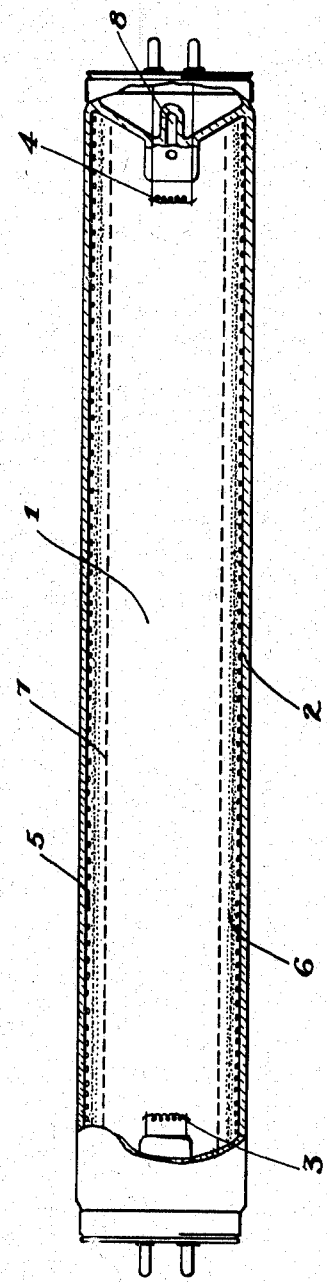
George E. Holman
INVENTOR.
BY Lawrence Burns,
Attorney Patented Oct. 20, 1942

2,299,720

UNITED STATES PATENT OFFICE 2,299,720

LUMINESCENT COATING FOR ELECTRIC LAMPS

George E. Holman, Melrose, Mass., assignor to Sylvania Electric Products Inc., a corporation of Massachusetts Application October 26, 1940, Serial No. 362,983

3 Claims. (Cl. 176—122)

This invention relates to electric lamps and in particular to the luminescent material applied to the walls of the glass envelope of such lamps.

An object of this invention is to provide for such lamps a coating of luminescent material that will be firmly adherent, and that may be easily applied.

Another object is to provide a coating of luminescent material that possesses high efficiency and maintenance characteristics.

Further objects, advantages and features of this invention will be apparent from the following description, taken in conjunction with the accompanying drawing in which the figure is a side view, partly in section of a lamp according to my invention.

The lamp envelope 1, which may be a glass tube 2, has the electrodes 3 and 4 sealed to it at each end, a coating 5 of filter material applied to the inner walls of the envelope, a coating 6 of equal parts of filter and luminescent material and a coating 7 of luminescent material. The envelope is sealed at the exhaust tubulation 8, and contains an inert or rare gas, such as argon or neon for example, at low pressure, and generally a small quantity of mercury vapor. An electrical discharge may be produced between the electrodes 3 and 4 giving off ultra-violet light, cathode rays, ions, atoms or the like which will fall on the luminescent coating 7, causing it to give off light by fluorescence, phosphorescence or the like which may be conveniently grouped under the generic term "luminescence."

The color of the light emitted when a layer of luminescent material is excited by a discharge such as takes place in the lamp first described depends on the material used. Certain materials and certain mixtures of materials will give certain colors and shades of colors. Certain colors, such as gold, for example, are not commercially obtainable by the use of any known material or combination or mixture of materials. Thus to obtain any color which cannot be produced from any material or combination of materials it has been the practice to use a luminescent material which contains the wavelengths corresponding to the desired color and then, interpose a filter layer that will transmit the wavelengths corresponding to the desired color and absorb wavelengths of a different color.

There are distinct disadvantages to this method of obtaining certain colors one of the greatest being the peeling of the luminescent layer from the filter layer. Although the use of less plasticizer in the luminescent coating mixture helps to some extent to obviate the peeling, it does not eliminate it. Other disadvantages resulting from this method are a coarse coating and poor light efficiency of the lamp.

To obtain a color that is not obtainable by any known light-emitting material or combination of such materials, and at the same time obtain a lamp of high efficiency with a smooth coating free from peeling tendencies, I have employed an intermediate layer 6 between the filter layer 5 and the luminescent layer 7. This intermediate layer is a mixture of equal parts of the filter material and the luminescent material.

Thus, for example, if a gold lamp were desired, a pink fluorescing zinc beryllium silicate may be used for the luminescent material and any pigment such as cadmium sulphide, to which a little barium sulphate is added to dilute the color and effect a greater transparency, may be used for the filter layer. It has been found that a very effective filter layer may be obtained by using 50% by weight of the cadmium sulphide, and 50% by weight of the barium sulphate. However, this is an arbitrary matter and other proportions may be used effectively. The filter layer will serve to absorb some of the green and the blue light being emitted and permit only the yellow to be transmitted.

To prevent the luminescent layer from peeling from the filter layer, an intermediate layer of luminescent and filter is used. By mixing equal parts of filter and fluorescent mixtures a greater amount of light of the desired wavelength is transmitted, a smoother appearing coating results and the disadvantage of peeling is obviated. It has been found that the lamps are 15 to 20% brighter when this intermediate layer is used.

Although I have used gold as an example, this procedure may be followed in all cases where the desired color is one not obtainable from any known light-emitting material or materials.

The application of these three layers may be made in several ways. However, I have found the following method of application desirable: first apply the layer of filter material and let it dry; then invert the tubing being coated and apply the layer comprising the mixture of filter material and luminescent material; allow this layer to dry and then bake it; invert the tubing again and apply the layer of luminescent material.

What I claim is:

1. A coating on the inner walls of an electric gaseous discharge lamp comprising: a primary layer of light-filtering material, an intermediate layer comprising a mixture of substantially 50% by weight of light-filtering material and 50% by weight of luminescent material and a final layer of luminescent material.

2. A coating on the inner walls of an electric gaseous discharge lamp comprising: a primary layer of a material capable of transmitting the wavelengths of light corresponding to a desired color and capable also of absorbing all other wavelengths; an intermediate layer comprising a mixture of substantially equal parts by weight of said primary layer material and a luminescent layer material; and a final layer of said luminescent material capable of emitting, among other wavelengths of light, the wavelength corresponding to the desired color.

3. A coating of the character described, said coating including: a layer comprising light filtering material only, on the inner walls of an electric gaseous discharge lamp; a layer comprising luminescent material only, within said lamp and overlying said layer of light filtering material, and a binding agent in the form of a pre-mixed and separately joined layer comprising a mixture of light filtering material and luminescent material, said binding layer lying between and joining said filter layer and said luminescent layer.

GEORGE E. HOLMAN.